(12) United States Patent
Oka et al.

(10) Patent No.: US 7,450,255 B2
(45) Date of Patent: Nov. 11, 2008

(54) PHOTOGRAPH RECORD AUTHORING SYSTEM

(75) Inventors: Kiyoshi Oka, Huntington Beach, CA (US); Francisco Rodriguez, Irvine, CA (US)

(73) Assignee: Canon U.S.A., Inc., Lake Success, NY (US)

( * ) Notice: Subject to any disclaimer, the term of this patent is extended or adjusted under 35 U.S.C. 154(b) by 686 days.

(21) Appl. No.: 09/759,234

(22) Filed: Jan. 16, 2001

(65) Prior Publication Data

US 2003/0160995 A1    Aug. 28, 2003

(51) Int. Cl.
G06F 3/12      (2006.01)
G06F 15/00   (2006.01)
G06K 1/00    (2006.01)

(52) U.S. Cl. ............... 358/1.15; 358/1.16; 712/29; 382/305

(58) Field of Classification Search ....... 358/1.15–1.18, 358/403–404, 1.1; 710/6, 21, 27, 29; 711/113; 712/29; 382/305; 345/600
See application file for complete search history.

(56) References Cited

U.S. PATENT DOCUMENTS

| | | | | |
|---|---|---|---|---|
| 4,943,136 A | * | 7/1990 | Popoff | 385/46 |
| 5,218,455 A | * | 6/1993 | Kristy | 358/403 |
| 5,590,284 A | * | 12/1996 | Crosetto | 712/29 |
| 5,685,002 A | * | 11/1997 | Sano | 715/517 |
| 5,710,873 A | * | 1/1998 | Romano et al. | 358/1.16 |
| 5,764,870 A | * | 6/1998 | Manico et al. | 358/1.18 |
| 5,930,465 A | * | 7/1999 | Bellucco et al. | 358/1.15 |
| 5,949,411 A | * | 9/1999 | Doerr et al. | 345/716 |
| 5,978,559 A | * | 11/1999 | Quinion | 358/1.15 |
| 6,031,976 A | * | 2/2000 | Koakutsu et al. | 358/1.16 |
| 6,085,195 A | * | 7/2000 | Hoyt et al. | 707/10 |
| 6,285,459 B1 | * | 9/2001 | Koakutsu et al. | 358/1.15 |
| 6,289,416 B1 | * | 9/2001 | Fukushima et al. | 711/113 |
| 6,393,206 B1 | * | 5/2002 | Yagi et al. | 386/125 |
| 6,421,782 B1 | * | 7/2002 | Yanagisawa et al. | 713/201 |

FOREIGN PATENT DOCUMENTS

JP      10-239780      9/1998

OTHER PUBLICATIONS

Inside Adobe Photoshop 5, by Gary David Bouton and Barbara Bouton, copyright 1998, New Riders Publishing.*
Using MPI—Portable Parallel Programming with the Message Passing Interface, second edition, by William Gropp, Ewing Lusk and Anthony Skjellum, copyright 1999, The MIT Press, pp. 14-18 and pp. 35-42.*

* cited by examiner

*Primary Examiner*—Edward L Coles
*Assistant Examiner*—James A Thompson
(74) *Attorney, Agent, or Firm*—Fitzpatrick, Cella, Harper & Scinto

(57) ABSTRACT

Authoring a plurality of digital image records, each digital image record corresponding to a separate customer order, in a digital image record authoring system including a dedicated computer, including scanning a plurality of images corresponding to a separate customer order from a scanner into a plurality of digital images, the scanner being connected to the dedicated computer by a first interface bus, processing the plurality of digital images and combining the processed plurality of digital images into a record image, and writing the record image by an image-recorder to a medium, the image-recorder being connected to the dedicated computer by a second interface bus, wherein the scanning is repeated, prior to completion of the writing of the previous record image, to scan a new plurality of images corresponding to a new customer order from the scanner into a new plurality of digital images.

37 Claims, 14 Drawing Sheets

```
#COUNT=2
#PURPOSE=4x6
#ORDER-01233
DH_A036.JPG
DH_A037.JPG
```

*FIG. 13C*

```
#COUNT=8
#PURPOSE=CD
#ORDER-01233
DH_A035.bmp
DH_A036.bmp
DH_A037.bmp
DH_A038.bmp
DH_A039.bmp
DH_A040.bmp
DH_A041.bmp
DH_A042.bmp
```

*FIG. 13B*

```
#COUNT=8
#ORDER-01233
DH_A035.JPG
DH_A036.JPG
DH_A037.JPG
DH_A038.JPG
DH_A039.JPG
DH_A040.JPG
DH_A041.JPG
DH_A042.JPG
```

*FIG. 13A*

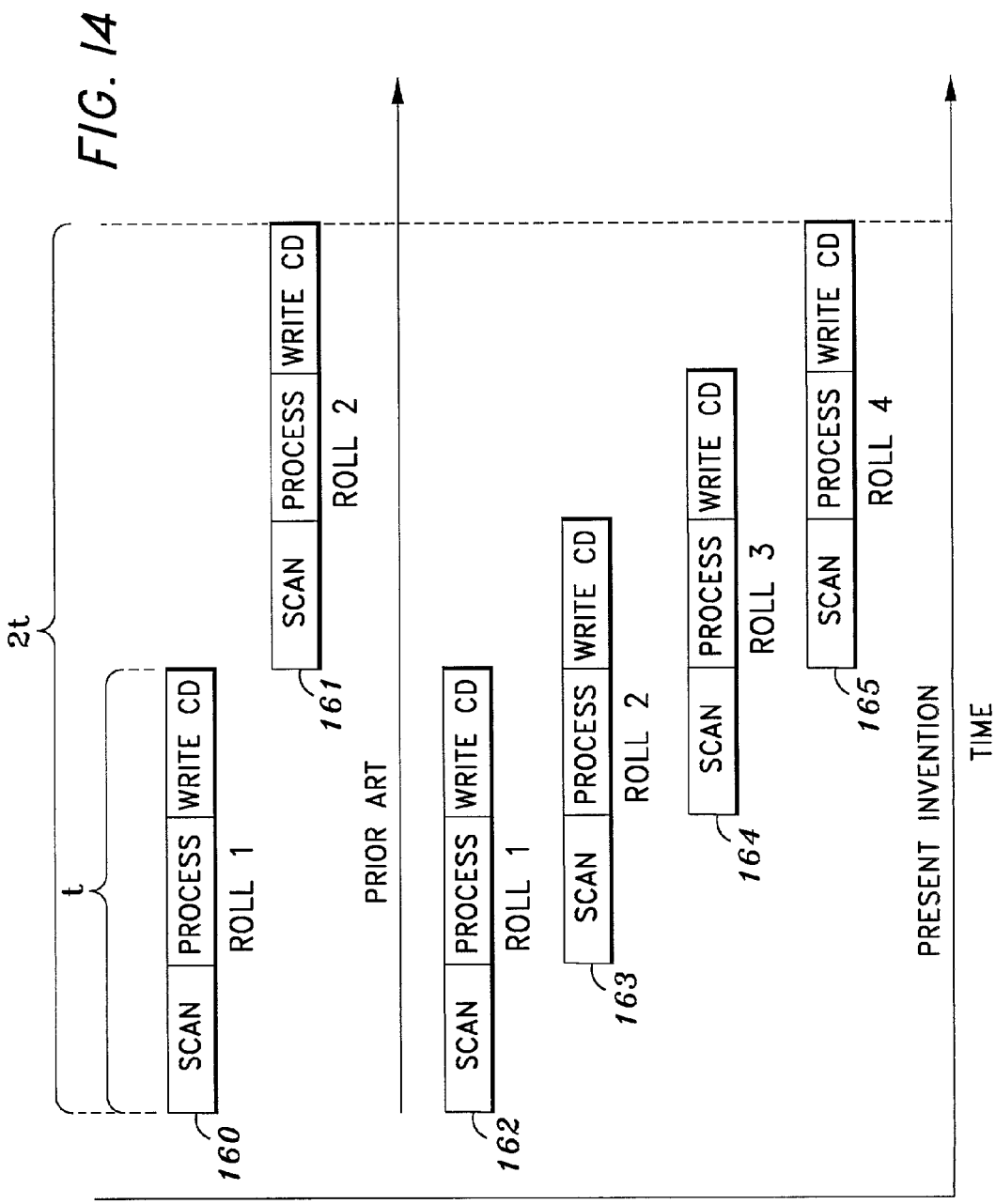

PHOTOGRAPH RECORD AUTHORING SYSTEM

BACKGROUND OF THE INVENTION

1. Field of the Invention

The invention concerns a CD authoring system for quickly and inexpensively inputting, organizing and processing photo images corresponding to one customer order and then writing the processed photo images onto a CD-ROM while simultaneously beginning processing of a second customer order before the completion of writing the photo images for the first customer order to the CD-ROM.

2. Description of the Related Art

The advent of relatively inexpensive CD-ROM recording devices, often referred to as read-writable CD-ROMs, has allowed the photo processing industry to offer its customers the ability to receive their processed photographs on a CD-ROM, in addition to conventional media such as photo paper and floppy diskette. When read-writeable CD-ROM devices, hereinafter referred to as CD-recorders, initially became available, they were very expensive and somewhat difficult to use. Therefore, the authoring of a CD-ROM containing a customer's collection of photographs was typically done at a central photo processing facility having such a CD-recorder. Accordingly, local photo processing facilities, such as drugstores and local photography stores, had to send a customer order with the customer's images, either on film or on photo paper, to the central processing facility to be scanned, processed and then written to a CD-ROM via a CD-recorder.

Recently, the cost of quality CD-recorders has reduced drastically and they have also become more user-friendly. As a result, many local photo processing facilities, such as those mentioned above, have been able to purchase CD authoring systems for providing customers with a CD-ROM of their photo images in addition to conventional images on photo paper. Several manufacturers have developed CD authoring systems for use by local photo processing facilities and by other entities. For example, one such photo CD authoring system utilizes a single personal computer to obtain photo images from a source, such as a scanner or digital camera, to process the collected images and then to write the collected images to a CD-ROM via a CD-recorder. The use of a single personal computer to perform these tasks results in a CD authoring system which takes up less space within the local photo processing facility and which can be operated by a single operator.

Such a conventional single-PC CD authoring system utilizes the various interface buses of the PC to interface to the necessary peripheral devices which comprise the CD authoring system. For example, the central processing unit (CPU) of the PC is typically directly connected to four different types of interface buses including a host bus, a USB bus, a PCI bus and an IDE bus. In such a conventional, single-PC CD authoring system, the host bus is used to communicate the CPU with a random access memory (RAM), a mouse and a keyboard. The USB bus is used to communicate between the CPU and a printer and a digital camera. The PCI bus is used to connect the PC to a pointer pen for selection of functions on a display connected to the PC, and the PCI bus is also connected to a PCI-SCSI bridge which enables the PCI bus to communicate with peripheral devices on a SCSI bus. A SCSI bus is utilized because it is a high-speed interface and therefore is desirable to support connection of peripheral devices to the PC which require higher-speed data transfer rates. Therefore, in a typical CD authoring system which is comprised of a single PC, a SCSI bus is utilized to connect a scanner, such as a film scanner or a flatbed scanner, and a CD-recorder to the PC. The IDE bus is utilized to connect the CPU to the disk storage medium of the PC, such as a hard disk.

In such a CD authoring system as described above, photo images are input to the PC by scanning them on the scanner which is connected to the PC via the SCSI bus. In the alternative, photo images may be brought into the PC by a digital camera via the USB bus. The CPU then processes the collected photo images as desired by an operator using a mouse, keyboard and pen, and the processed photo images are then collected and written to a CD-ROM provided in the CD-recorder which is connected to the PC by the SCSI bus. In this manner, an operator utilizing the CD authoring system comprised of a single PC is able to process a customer order, typically corresponding to a roll of film, from the initial step of scanning to the final step of completed writing of the processed photo images to the CD-ROM. After one customer order is completed in this fashion, the operator can then begin the processing for the next customer order. Therefore, a local photo processing facility is able to utilize a single operator to operate the CD authoring system in order to provide CD-ROM photo service to its customers.

Such a conventional CD authoring system may take at least seven to ten minutes for an operator to complete the authoring of a CD-ROM containing the photo images for one customer order. This is because the time to scan a roll of film may typically take about three minutes, the time to process the images, such as color correction, rotation and cropping, may take approximately two to five minutes, and the time to write all of the processed photo images to a CD-ROM by the CD-recorder may take approximately two minutes. Such a CD authoring system as described above has the drawback that an operator of the system must simply stand by idle while the CD-recorder is writing the photo images for one customer to the CD-ROM and cannot start the CD authoring process for the next customer order until the photo images for the first customer order have been written to the CD-ROM successfully. This time constraint exists because a SCSI bus can only support communication between the PC and one peripheral device at a time.

For example, when a scanner which is connected to the SCSI bus is scanning-in a role of film, the PC cannot communicate with the CD-recorder which is also connected to the PC by the SCSI bus. In the alternative, when the CD-recorder is being utilized by the PC to write the photo images for a customer order to a CD-ROM, the PC cannot communicate with the film scanner on the SCSI bus to scan the photo images corresponding to the next customer order. CD authoring systems, as described above, are often used in local photo processing facilities which operate in a high-volume environment requiring the operator of the CD authoring system to create CD-ROMs for a large number of customer orders as quickly as possible in order to provide a fast and efficient photo service for the customer. Therefore, the inability of the operator to begin a new customer order on the CD authoring system until the previous customer order has been completely and successfully written to the CD-ROM results in increased time to complete the customer orders.

Although SCSI interfaces existed which allowed parallel communication with multiple peripheral devices, they were not beneficial for use in the aforementioned CD authoring systems. This is because communication over the SCSI parallel interface is shared between the multiple peripheral devices on an as-needed basis. As a result, it was not possible to guarantee a constant rate of data transfer over the SCSI between the computer and a peripheral device, such as a CD-recorder, when another peripheral device, such as a scanner, was in use. Communication errors may also arise during the use of multiple peripheral devices in such a parallel SCSI environment. In this regard, system timing is critical during the recording of a CD-ROM, otherwise errors may frequently occur in the recording process due to lost data. Accordingly, the use of a parallel SCSI interface for connecting multiple peripherals in a CD authoring system was not desirable because of the lack of a constant data transfer rate between the computer and the CD-recorder.

In addition to the increased time, the foregoing constraint of the conventional single-PC CD authoring system also generates confusion on the part of the operator because the operator may forget that a previous customer order is still being written to the CD-ROM as the operator attempts to scan-in pictures for a new customer order, thereby frustrating the operator and possibly causing errors with the CD authoring system. In addition, there may be confusion on the part of the operator because the operator may forget which customer order a previously-written CD-ROM corresponds to as the operator begins processing for a new customer order, especially if the previous customer order was not successfully written to a CD-ROM.

Accordingly, what is needed is a CD authoring system which utilizes a single PC, but which has improved efficiency and reduces operator confusion.

SUMMARY OF THE INVENTION

The present invention addresses the foregoing problems by providing an improved CD authoring system which allows an operator to begin processing for a next customer order prior to completion of the current customer order. Specifically, the invention allows the operator to begin scanning of the images corresponding to the next customer order while the CD-ROM for the current, or previous, customer order is being written. In this manner, an improved CD authoring system is provided which significantly reduces the time required to process multiple customer orders, and which also reduces operator confusion.

Accordingly, one aspect of the invention concerns the authoring of a plurality of digital image records, each digital image record corresponding to a separate customer order, in a digital image record authoring system including a dedicated computer, including scanning a plurality of images corresponding to a separate customer order from a scanner into a plurality of digital images, the scanner being connected to the dedicated computer by a first interface bus, processing the plurality of digital images and combining the processed plurality of digital images into a record image, and writing the record image by an image-recorder to a medium, the image-recorder being connected to the dedicated computer by a second interface bus, wherein the scanning is repeated, prior to completion of the writing of the previous record image, to scan a new plurality of images corresponding to a new customer order from the scanner into a new plurality of digital images.

The medium is preferably a CD-ROM and the image-recorder is preferably a CD-recorder. Preferably, the invention includes adjusting each of the plurality of digital images, such as cropping, rotation, color adjustment, etc. Also, a print index is preferably generated and printed which contains thumbnail versions of the digital images to be written on the medium. The new plurality of digital images is preferably processed and combined into a new record image, and the new record image is written to a new medium residing in the image-recorder after completion of the writing for the previous record image. In addition, the record images are preferably sent to an image-queue, and are then retrieved one at a time and written to a respective medium. Similarly, each print index is preferably written to a print queue and subsequently retrieved from the print queue for printing. In addition, a write status indicator is preferably generated during the writing step to indicate whether the write has been successful. If the write has not been successful, the operator is notified and writing of another record image is not allowed until the condition is remedied. Lastly, the various components of invention are capable of being executed in a distributed manner across two or more personal computers connected via a network.

By virtue of the foregoing, the invention allows the operator to begin scanning of the images corresponding to the next customer order while the record image for the current, or previous, customer order is being written. In this manner, an improved record authoring system is provided which significantly reduces the time required to process multiple customer orders, and which also reduces operator confusion.

In a second aspect, the invention provides for the authoring of a plurality of digital image records, each digital image record corresponding to a separate customer order, in a digital image record authoring system including a dedicated computer, including scanning a plurality of images corresponding to a separate customer order from a scanner into a plurality of digital images, the scanner being connected to the dedicated computer by a first interface bus, processing the plurality of digital images and combining the processed plurality of digital images into a record image, and writing the record image by an image-recorder to a medium, the image-recorder being connected to the dedicated computer by a second interface bus and the record image being passed from the dedicated computer to the image-recorder at a constant rate, wherein the scanning is repeated, prior to completion of the writing of the previous record image, to scan a new plurality of images corresponding to a new customer order from the scanner into a new plurality of digital images.

The medium is preferably a CD-ROM and the image-recorder is preferably a CD-recorder. Preferably, the invention includes adjusting each of the plurality of digital images, such as cropping, rotation, color adjustment, etc. Also, a print index is preferably generated and printed which contains thumbnail versions of the digital images to be written on the medium. The new plurality of digital images is preferably processed and combined into a new record image, and the new record image is written to a new medium residing in the image-recorder after completion of the writing for the previous record image. In addition, the record images are preferably sent to an image-queue, and are then retrieved one at a time and written to a respective medium. Similarly, each print index is preferably written to a print queue and subsequently retrieved from the print queue for printing. In addition, a write status indicator is preferably generated during the writing step to indicate whether the write has been successful. If the write has not been successful, the operator is notified and writing of another record image is not allowed until the condition is remedied. Lastly, the various components of invention are capable of being executed in a distributed manner across two or more computers connected via a network.

By virtue of the foregoing, the invention allows the operator to begin scanning of the images corresponding to the next customer order while the record image for the current, or previous, customer order is being written. In this manner, an improved record authoring system is provided which significantly reduces the time required to process multiple customer orders, and which also reduces operator confusion.

According to another aspect, the invention concerns the authoring of a plurality of digital image CD-ROMs, each digital image CD-ROM corresponding to a separate customer order, in a digital image CD-ROM authoring system including a dedicated computer, including scanning a plurality of images corresponding to a separate customer order from a scanner into a plurality of digital images, the scanner being connected to the dedicated computer by a first interface bus, adjusting each of the plurality of digital images which were scanned in from the scanner, generating a print index file containing a thumbnail representation of each of the adjusted plurality of digital images, the print index file for printing by a printer, processing the plurality of digital images and combining the processed plurality of digital images into a CD-ROM image, and writing the CD-ROM image to a CD-ROM residing in a CD-recorder connected to the dedicated computer by a second interface bus, wherein the scanning is repeated, prior to completion of the writing of the previous CD-ROM image, to scan a new plurality of images corresponding to a new customer order from the scanner into a new plurality of digital images, the processing is repeated to process the new plurality of digital images and to combine the processed new plurality of digital images into a new CD-ROM image, and the writing is repeated to write the new CD-ROM image to a new CD-ROM placed in the CD-recorder after completion of the writing of the previous CD-ROM image.

Preferably, the CD-ROM images are sent to a CD-write queue, and are then retrieved one at a time and written to a respective CD-ROM. Similarly, each print index is preferably written to a print queue and subsequently retrieved from the print queue for printing. In addition, a CD-write status indicator is preferably generated during the CD-writing step to indicate whether the CD-write has been successful. If the CD-write has not been successful, the operator is notified and a CD-write of another CD-ROM image is not allowed until the condition is remedied. Lastly, the various components of invention are capable of being executed in a distributed manner across two or more computers connected via a network.

By virtue of the foregoing, the invention allows the operator to begin scanning of the images corresponding to the next customer order while the CD-ROM for the current, or previous, customer order is being written. In this manner, an improved CD authoring system is provided which significantly reduces the time required to process multiple customer orders, and which also reduces operator confusion.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 13A, 13B and 13C are block diagrams for depicting job files according to one embodiment of the invention.

FIG. 14 is a timing chart for describing the timing of the invention according to FIGS. 9 through 12.

DETAILED DESCRIPTION OF THE PREFERRED EMBODIMENTS

The present invention concerns a CD authoring system for quickly and efficiently inputting, organizing and processing photo images corresponding to a first customer order into a record image, sending the record image to a CD-recorder for writing to a CD-ROM, and then beginning the inputting of photo images corresponding to a second customer order prior to completion of writing the previous record image to the CD-ROM. The present invention achieves this by simultaneously exploiting the capabilities of separate communication buses within a computer of the CD authoring system in order to perform the aforementioned parallel processes. Accordingly, the present invention allows for the authoring of photo CDs in an efficient and time-saving manner, while reducing operator confusion during the handling of subsequent customer orders.

Figure 1:
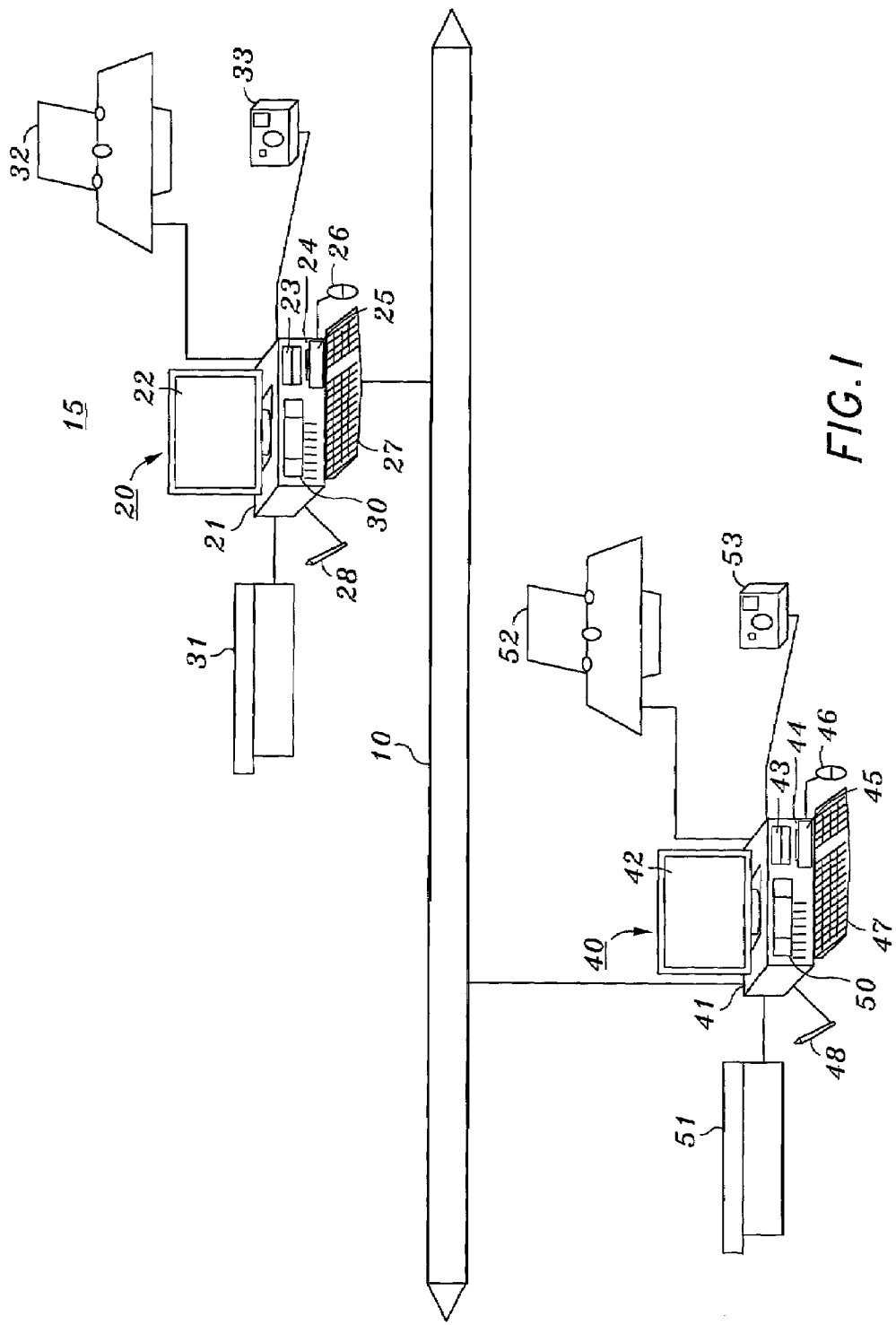
FIG. 1 is a representation of a networked computing environment in which the invention may be practiced according to one embodiment of the invention.

Turning to FIG. 1, a networked computing environment is depicted in which one embodiment of the present invention may be practiced. As seen in FIG. 1, network 10 is provided to which two separate computer-based systems are connected. Specifically, photograph record authoring system 15 is connected to network 10 and is comprised of computer 20, which is preferably a personal computer of sufficient processing speed and memory capabilities, and which is a dedicated computer for carrying out the present invention. Computer 40 is similar to computer 20 and is also connected to network 10 for use in conjunction with computer 20 according to a second embodiment of the present invention, as will be discussed more fully below.

As with known personal computers, computer 20 includes host processor 21, display 22, fixed hard disk 25, floppy disk drive 24, pointing device (mouse) 26, and keyboard 27. Also included in computer 20 for purposes of the present invention are internally mounted CD recorder 23 for writing record images to CD-ROMs, pen device 28 for convenient user interface with display 22, and internally mounted film scanner 30 for scanning photograph film images into computer 20. Flatbed scanner 31 and digital camera 33 are externally connected to computer 20 and are also provided for inputting images to computer 20. Printer 32 is connected to computer 32 and is provided for printing index prints of the record images written by CD recorder 23 to CD-ROMs, as well as printing particular photo images and other print jobs.

In this manner, photograph record authoring system 15 has the capability to input digital photo images from a variety of sources, process them onto a record image, write the record image to a CD-ROM, and print a corresponding index of the record image. It can be appreciated that photograph record authoring system 15 can also obtain digital photo images from other sources such as a digital video camera (not shown) or a website server via network 10 (not shown). It can also be appreciated that the present invention can also be practiced with record image writing devices for writing to other types of media than CD-ROMs, such as DVD, digital tape, diskette, digital mini-disc, memory cards, memory chips, and the like (not shown).

Computer 40 is similar to computer 20 and includes host processor 41, display 42, fixed hard disk 45, floppy disk drive 44, pointing device (mouse) 46, keyboard 47, internally mounted CD recorder 43, pen device 48, and internally mounted film scanner 50. Also as with computer 20, computer 40 has connected thereto flatbed scanner 51, digital camera 53 and printer 52. Computer 40 can therefore operate as a photograph record authoring system in a manner similar to computer 20, or can operate in conjunction with computer 20 in order to author photograph records in a distributed manner via network 10 according to a second embodiment of the invention.

Figure 2:
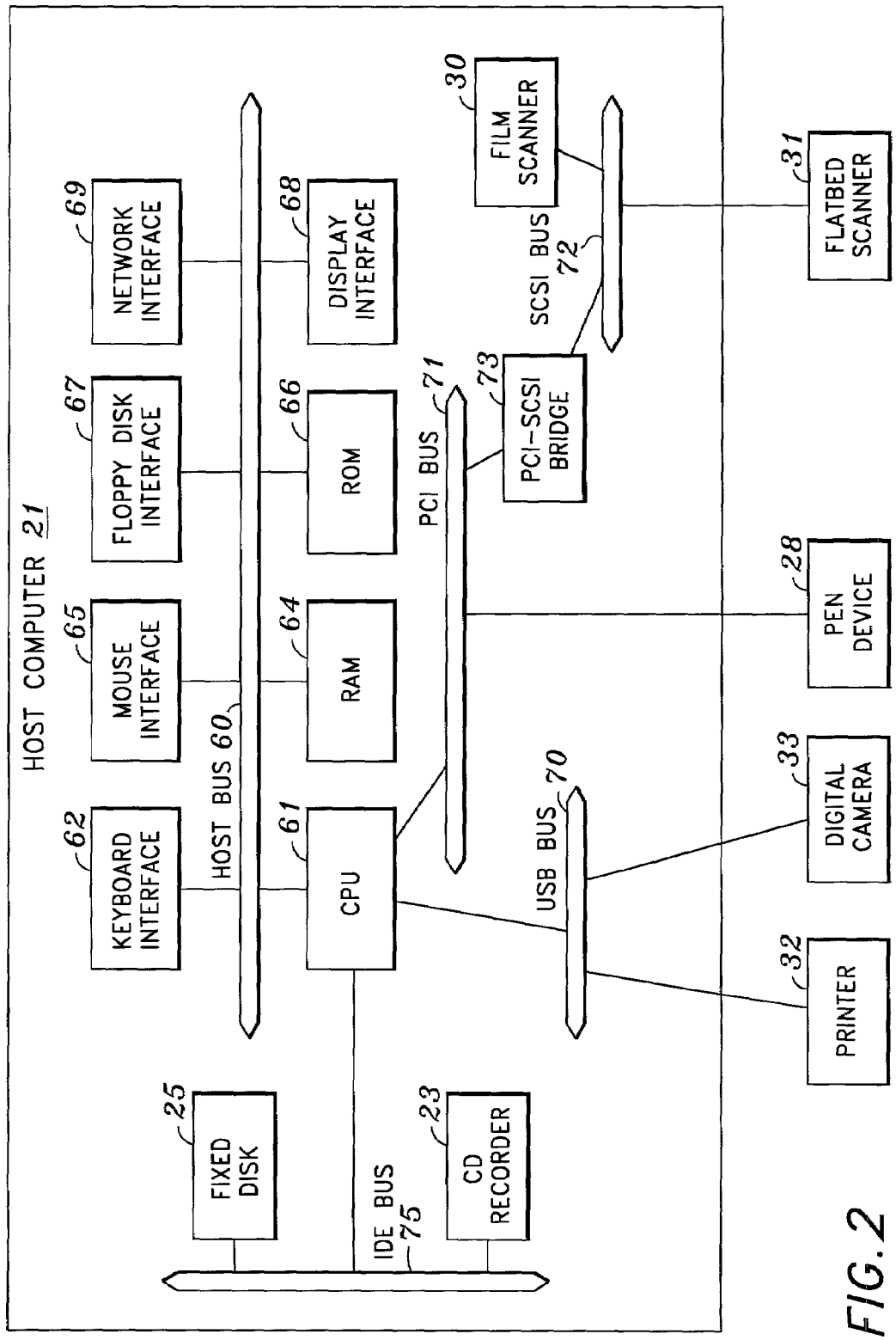
FIG. 2 is a block diagram representation of an internal architecture of a computer shown in FIG. 1.

FIG. 2 depicts the internal architecture of host computer 21 of computer 20. In particular, FIG. 2 depicts the internal components, and externally connected devices, of computer 20 in relation to the separate communication buses within host computer 21. Turning to FIG. 2, it can be seen that CPU (central processing unit) 61, such as a programmable microprocessor, is provided in host computer 21 and is directly connected to host bus 60, IDE bus 75, USB bus 70 and PCI bus 71, and is also indirectly connected to SCSI bus 72 via PCI-SCSI bridge 73 disposed on PCI bus 71. In this manner, CPU 61 can efficiently communicate with the various internal components of, and the various external devices connected to, computer 20.

Also coupled to host bus 60 are keyboard interface 62 for interfacing to keyboard 27, mouse interface 65 for interfacing to mouse 26, floppy disk interface 67 for interfacing to a floppy disk drive 24, display interface 68 for interfacing to display 22, and network interface 69 for interfacing to network 10. Fixed disk 25 and CD recorder 23 are connected to CPU 61 via IDE bus 75, which is preferably a high-speed, two-channel IDE bus for optimal efficient communication between each of fixed disk 25 and CD recorder 23 and CPU 61, respectively.

Random access memory ("RAM") 64 interfaces to host bus 60 to provide CPU 61 with access to memory storage, thereby acting as the main run-time memory for CPU 61. In particular, when executing stored program instruction sequences, CPU 61 loads those instruction sequences from fixed disk 25 (or other memory media) into random access memory ("RAM") 64 and executes those stored program instruction sequences out of RAM 64. It should also be noted that standard-disk swapping techniques available under windowing operating systems allow segments of memory to be swapped to and from RAM 64 and fixed disk 25. Read-only memory ("ROM") 66 is connected to CPU 61 via host bus 60 and stores invariant instruction sequences, such as start-up instruction sequences for CPU 61, or basic input/output operation system ("BIOS") sequences for the operation of peripheral devices attached to computer 20. In addition, RAM 64 is used as an image buffer memory for storing image data during editing and composing of images according to one embodiment of the present invention.

As seen in FIG. 2, CPU 61 is directly connected to PCI bus 71 to which pen device 28 is externally connected and to which PCI-SCSI bridge 73 is also connected. Film scanner 30 is internally connected to, and flatbed scanner 31 is externally connected to, SCSI bus 72 for indirect communication with CPU 61 via PCI-SCSI bridge 73 and PCI bus 71. CPU 61 is also directly connected to USB bus 70 to which printer 32 and digital camera 33 are externally connected.

Figure 3:
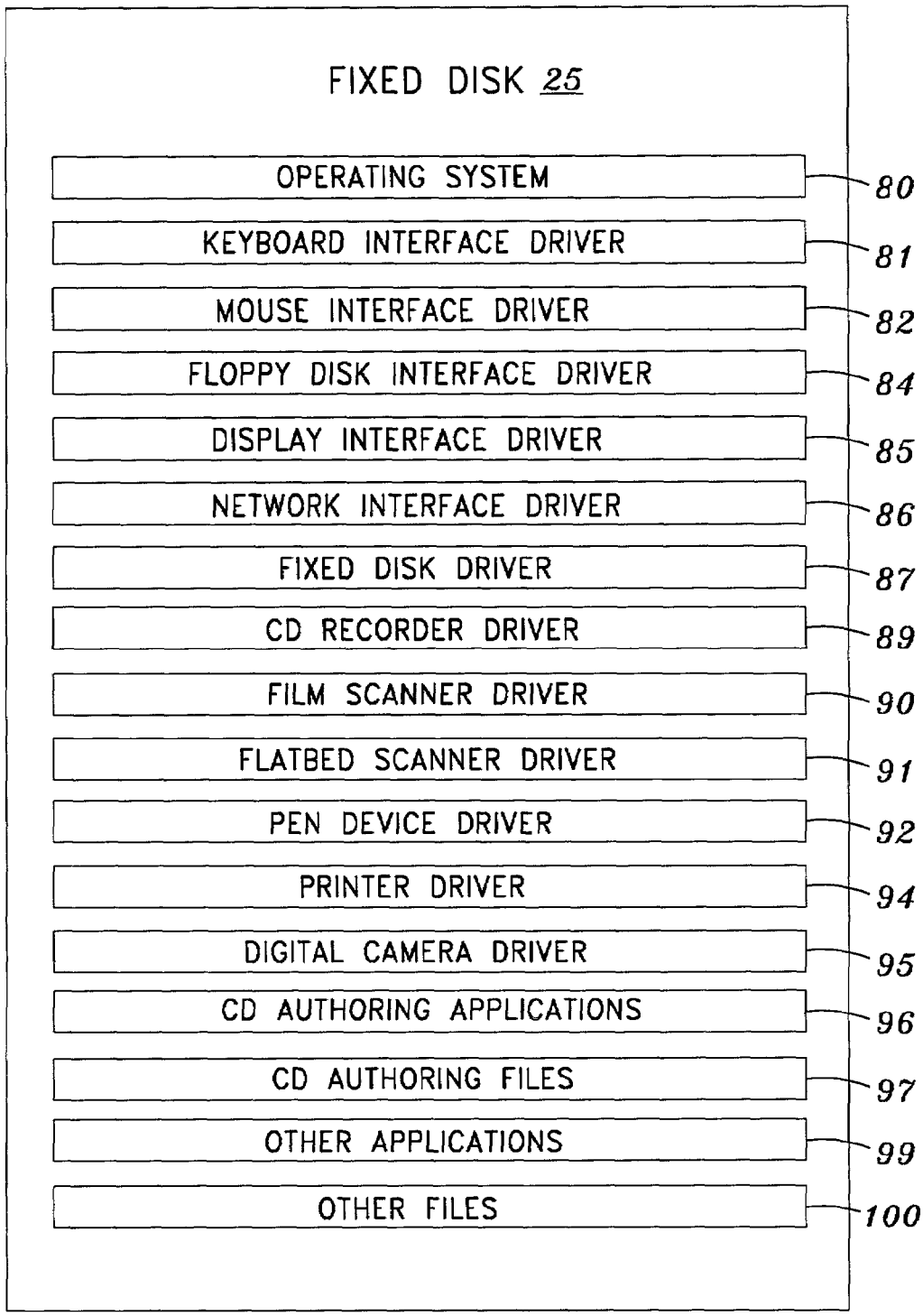
FIG. 3 is a block diagram representation of the fixed disk of the computer depicted in FIG. 2.

FIG. 3 depicts the contents of fixed disk 25, which is one example of a computer-readable medium that stores program instruction sequences executable by CPU 61. Accordingly, fixed disk 25 includes operating system 80 which is preferably a windowing operating system, such as Windows 2000, Windows NT, Windows 98, or Windows 95, although other types of operating systems such as DOS, UNIX and LINUX may be used with the present invention. Fixed disk 25 also includes keyboard interface driver 81 for driving keyboard interface 62, mouse interface driver 82 for driving mouse interface 65, floppy disk interface driver 84 for driving floppy disk interface 67, display interface driver 85 for driving display interface 68, and network interface driver 86 for driving network interface 69. Fixed disk 25 also includes fixed disk driver 87 for driving fixed disk 25, CD recorder driver 89 for driving CD recorder 23, film scanner driver 90 for driving film scanner 30, flatbed scanner driver 91 for driving flatbed scanner 31, pen device driver 92 for driving pen device 28, printer driver 94 for driving pen device printer 32, and digital camera driver 95 for driving digital camera 33.

Fixed disk 25 further includes CD authoring applications 96 which are the application modules necessary to implement the present invention, as well as CD authoring files 97 which are the files necessary to support CD authoring applications 96. CD authoring applications 96 and CD authoring files 97 are described in more detail below. Other applications 99 and other files 100 are also provided to represent other data and program files that may be used to operate computer 20 during implementation of the present invention.

Figure 4:
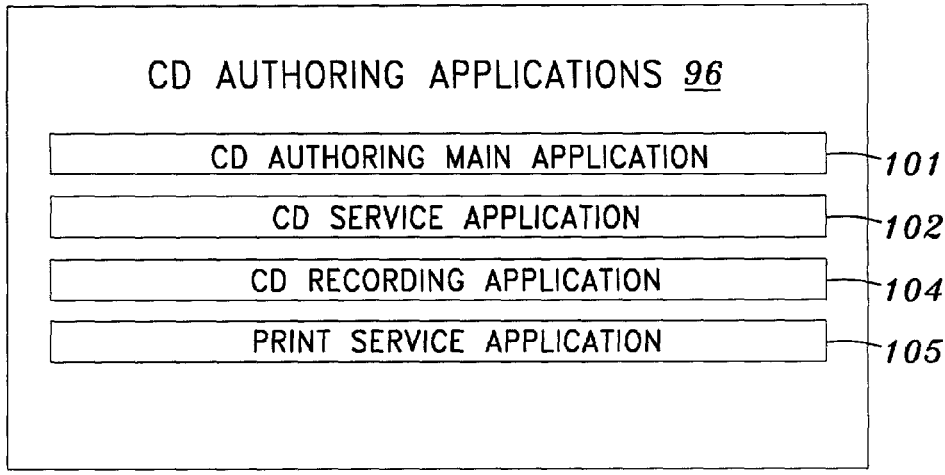
FIG. 4 is a block diagram describing the CD authoring applications of the fixed disk depicted in FIG. 3.

FIG. 4 depicts the various application modules included in CD authoring applications 96 of fixed disk 25. As seen in FIG. 4, CD authoring applications 96 includes CD authoring main application 101, which is the main executable application for authoring record images by inputting and adjusting image files of photos, CD service application 102, which builds each record image according to a separate customer order, CD recording application 104, which initiates the writing of each record image to a respective CD-ROM, and print service application, which builds an index print and other print files corresponding to each record image. Each of these applications are explained in more detail below.

Figure 5:
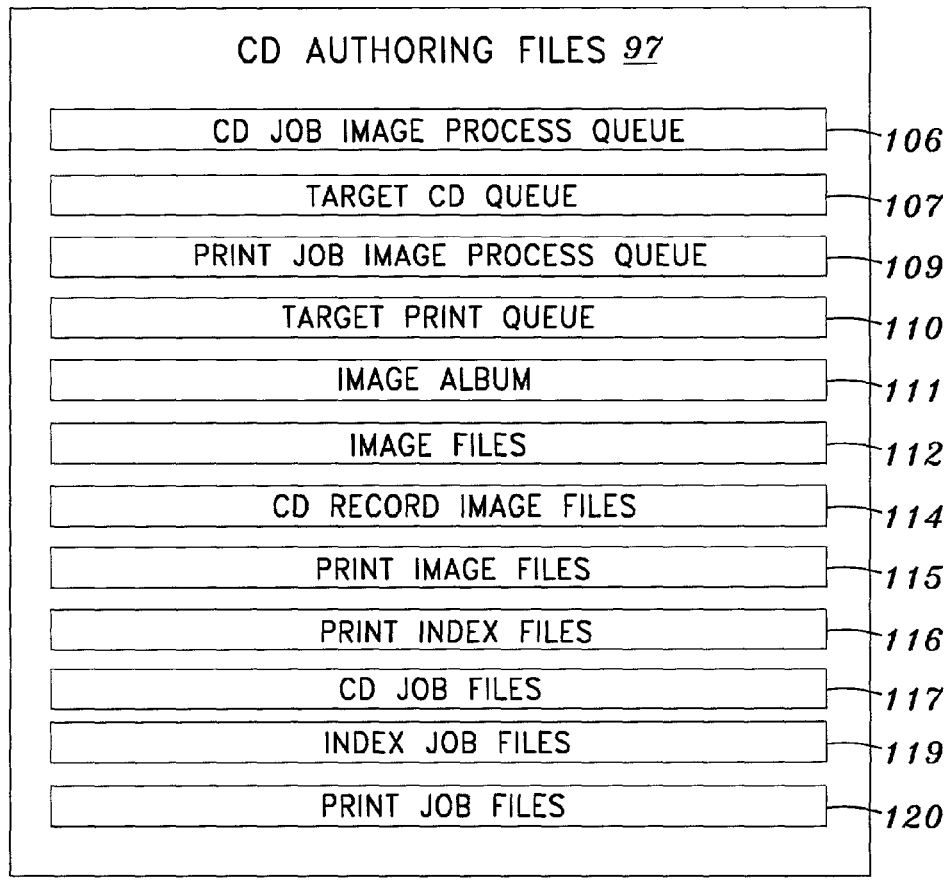
FIG. 5 is a block diagram describing the CD authoring files of the fixed disk depicted in FIG. 3.

FIG. 5 depicts the various files included in CD authoring files 97 of fixed disk 25. As seen in FIG. 5, CD authoring files 97 includes CD job image process queue 106 which is generated by CD authoring main application 101 and includes CD jobs to be processed by CD service application 102. Target CD queue 107 contains the record images that are generated by CD service application 102 based on the CD jobs and that are to be sent to CD recorder 23 by CD recording application 104. CD authoring files 97 also includes print job image process queue 109 which is generated by CD authoring main application 101 and includes print jobs to be processed by print service application 105. Target print queue 110 contains print index files and other print files that are generated by print service application 105 based on the print jobs and that are to be sent to printer 32 by the print manager of printer driver 94. Image album 111 contains all digital image files which have been input and adjusted by CD authoring main application 101. Image files 112 contains digital image files for subsequent access and use by the present invention or by other applications. CD record image files 114 includes CD record image files generated by CD service application 102 for CD jobs. Print image files 115 and print index files 116 include print image files and print index files, respectively, generated by print service application 105 for print jobs. CD job files 117, index job files 119 and print job files 120 represent files for each CD job, index job and print job, respectively, generated by CD authoring main application 101. The purpose and use of these files are discussed in more detail below.

Figure 6:
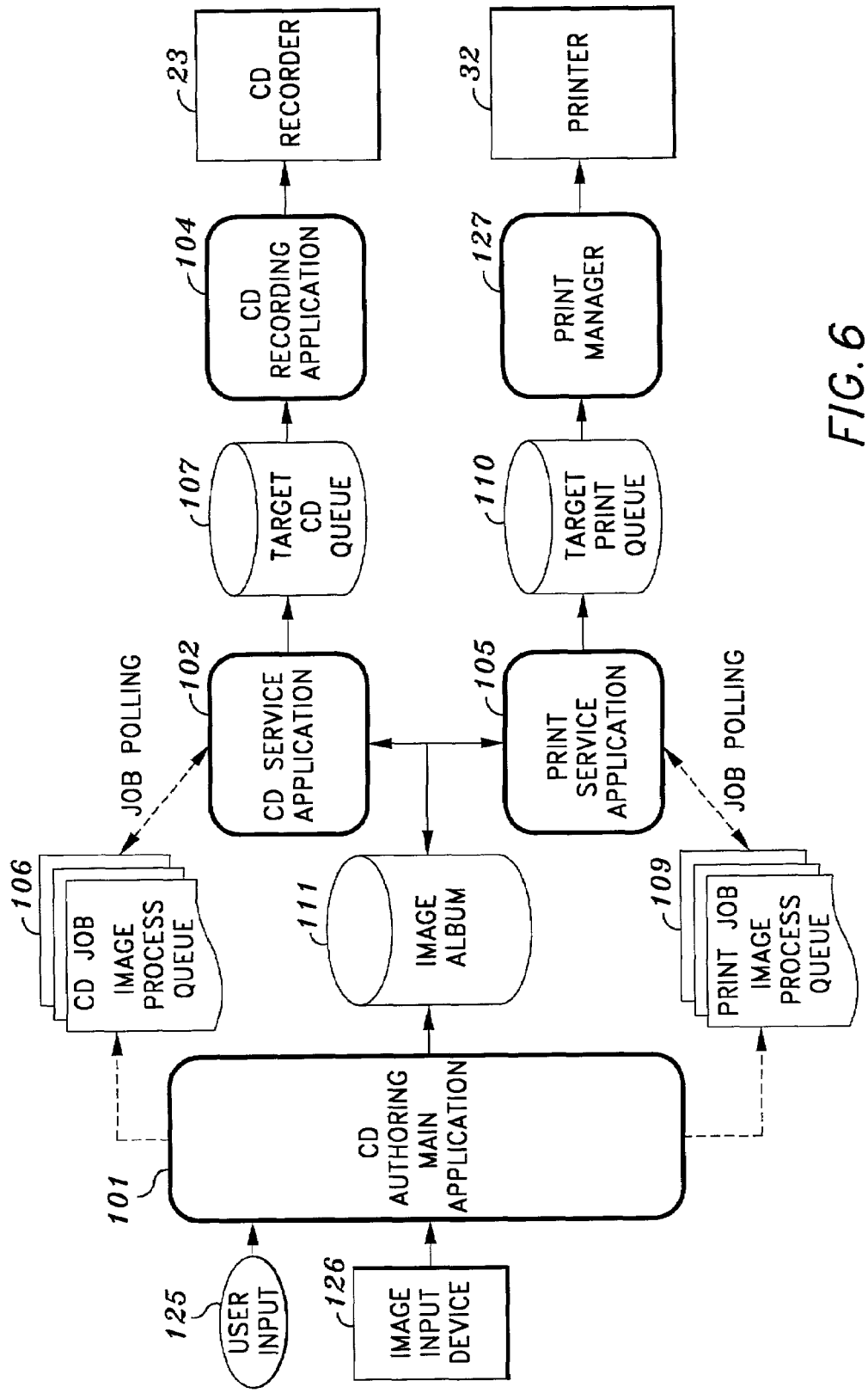
FIG. 6 is a block diagram which depicts a workflow of authoring digital image records to CD-ROMs according to one embodiment of the invention.

Turning to FIG. 6, a workflow of authoring digital image records to CD-ROMs is depicted. User input 125 is provided to CD authoring main application 101 via pen device 28, mouse 26, or keyboard 27 in order to initiate the CD authoring process for a customer order. For example, a user of photograph record authoring system 15 initiates the processing of a customer order through a series of user interface windows which are displayed on display 22. The user can utilize pen device 28 to select options displayed on display 22, or can use mouse 26 or keyboard 27 in the alternative. In particular, the user may enter information for each customer order such as customer identification and the source device from which digital images are to be obtained.

Image input 126 provides digital images to CD authoring main application 101 according to the source device identified by the user. For example, digital images for a particular customer order may be obtained from film scanner 30, flatbed scanner 31, or digital camera 33. As mentioned above, digital images may also be obtained from other source devices such as a digital video camera, website server, or other devices. CD authoring main application 101 then provides a series of user interface windows through which the user can select the digital images to be included in the CD job for the customer order, and then adjust the selected digital images. For example, the user may adjust a selected digital image by cropping, sizing, dusting, rotating, contrast adjustment, color adjustment, and sharpness adjustment through the use of pen device 28 and display 22. The image files representing the selected and adjusted digital images are then placed into image album 111 by CD authoring main application 101 for subsequent access and processing into a CD record image to be written to a CD-ROM. In addition, CD authoring main application 101 also creates low resolution thumbnail images corresponding to each of the selected and adjusted images and stores the thumbnail images into image album 111 for subsequent access by print service application 105 to be included into a print index file for printing.

CD authoring main application 101 then generates a CD job file for the customer order which is placed into CD job image process queue 106 and also generates an index job file, and print job file if image prints are requested, which are placed into print job image process queue 109. In this regard, CD authoring main application 101 initiates CD service application 102, CD recording application 104 and print service application 105 at startup of CD authoring main application 101. CD service application 102 then continuously polls CD job image process queue 106 to select the next one of CD job files 117 for processing. The CD job file is then read to determine which digital image files are to be retrieved from image album 111 and included in the record image for the job. The retrieved digital image files are then organized into a record image which is represented in one of CD record image files 114 and placed into target CD queue 107.

CD service application 102 then polls CD job image process queue 106 for the next one of CD job files 117. CD recording application 104 then polls target CD queue 107 for the next one of CD record image files 114, writes the CD record image to a blank CD-ROM in CD recorder 23, and verifies that the CD record image was properly written. CD recording application 104 then polls target CD queue 107 for the next one of CD record image files 114, and notifies the user to place a new CD-ROM into CD recorder 23. Print service application 105 also continuously polls print job image process queue 109 to select the next one of index job files 119 and print job files 120 for processing. The index job file is then read to determine which digital image files, preferably low resolution thumbnail images, are to be retrieved from image album 111 and included in the print index file to be printed for the job. The retrieved digital image files are then organized into one of index job files 119, and placed into target print queue 110. Print image files 115 may also be created by print service application 105, if a corresponding one of print job files 120 exists, and then placed into target print queue 110.

Print service application 105 then polls print job image process queue 109 for the next one of index job files 119 and print job files 117 corresponding to the next customer order. Print manager 127, which is provided by printer driver 94, then polls target print queue 110 for the next one of print index files 116 and print image files 115, and prints them on printing medium through printer 32. Print manager 127 then polls target print queue 110 for the next one of index job files 119 and print job files 117 corresponding to the next customer order. In this manner, the authoring of a record image to a CD-ROM is divided into multiple processes which run in parallel so that another customer order can be started even before the last customer order has been completed. For example, user input 125 may instruct CD authoring main application 101 to start a new customer order by scanning images in from film scanner 30 while the record image and the print index file of the previous customer order are still being written to a CD-ROM by CD recorder 23 and printed by printer 32, respectively. Accordingly, it can be appreciated that a user of photograph record authoring system 15 can process multiple customer orders quickly and efficiently, without having to wait for completion of the previous customer order before starting the next customer order. In addition, scanning of the photo images corresponding to the next customer order while writing the record image for the previous customer order to a CD-ROM is made possible because the scanner is on a different communication bus (SCSI bus 72) than that of CD recorder 23 (IDE bus 75). This allows for a constant rate of data transfer to CD recorder 23 which is necessary to avoid errors when writing the record image to the CD-ROM.

Figure 7:
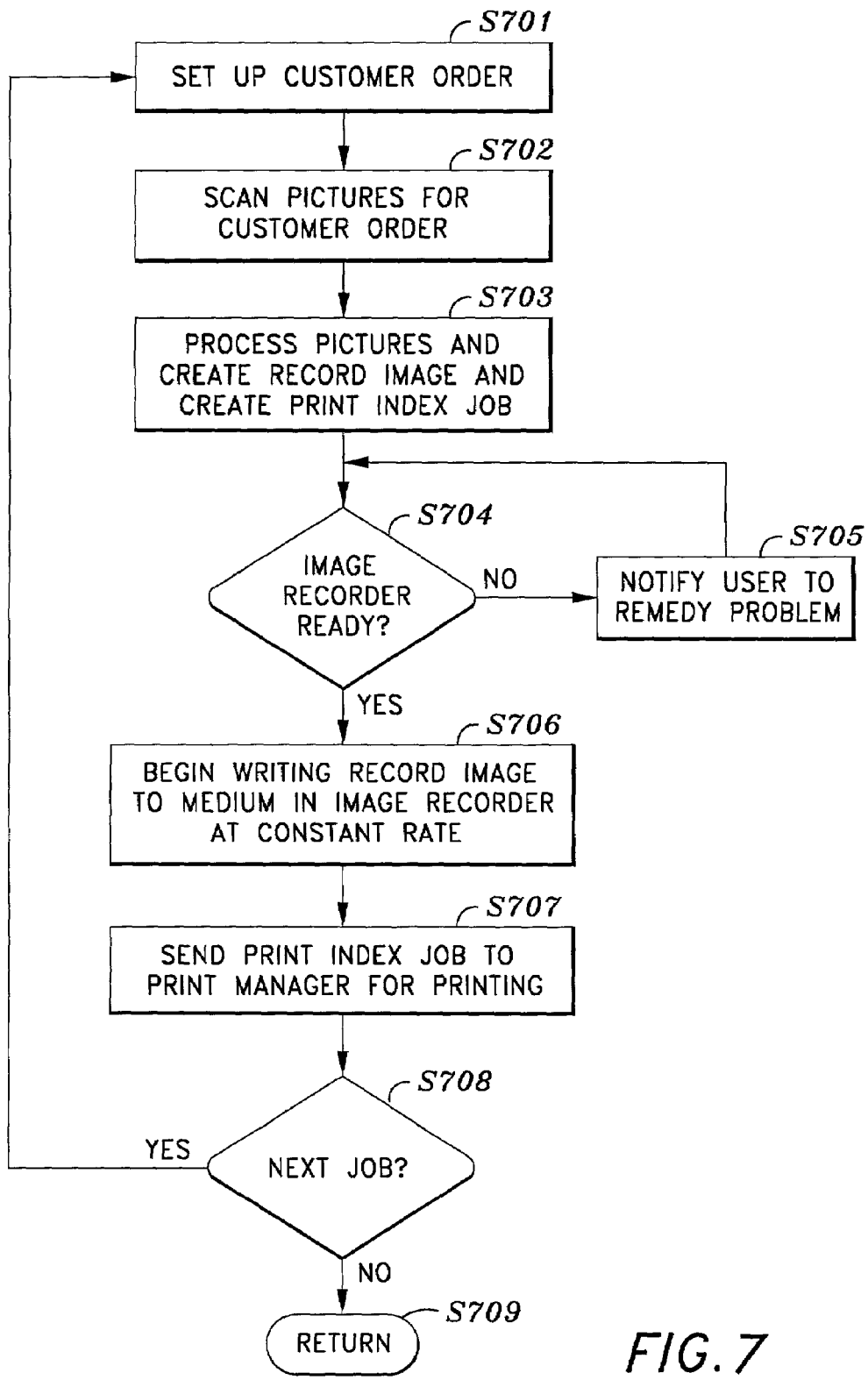
FIG. 7 is a top-level flow chart for describing the authoring of digital image records according to one embodiment of the invention.

Turning to FIG. 7, a top-level flow chart is provided for describing the authoring of digital image records according to a first embodiment of the invention. In step S701, the user of photograph record authoring system 15 sets-up a customer order by entering customer identification information and information regarding the pictures to be processed, such as number and type of pictures, as well as other related information. This information may be entered using keyboard 27, mouse 26 or pen device 28 in conjunction with display 22. Next, the user scans the pictures for the customer order by using film scanner 30 to scan a roll of film, or flatbed scanner 31 to scan photographs. This step may also be used to obtain digital images from another source such as digital camera 33, an internet site or another type of digital device step (S702).

In step S703, the scanned digital images from step S702 are processed, in which the user may adjust the pictures using pen device 28 and display 22 to apply functions to a selected digital image to rotate, adjust sharpness and contrast, crop, and dust the selected digital image, as well as other known image editing functions. The digital images are then processed to create different sized versions for writing to the medium, preferably a CD-ROM, and for printing on a print index. The processed digital images of the desired size are combined into a record image for writing to the medium, and the other size images, preferably thumbnail, are combine into a print index job file.

It is determined in step S704 whether the image recorder, preferably CD recorder 23, is ready with a blank CD-ROM for recording. If so, flow passes to step S706 wherein photograph record authoring system 15 begins writing the record image to the medium in the image recorder at a constant rate. In this example, the medium is a CD-ROM in CD recorder 23 which is connected to CPU 61 via IDE bus 75. As mentioned above, IDE bus 75 is a high-speed, two channel bus which transfers data to CD recorder 23 at a constant rate to facilitate the successful transfer of the record image to the CD-ROM.

If it is determined in step S704 that the image recorder is not ready for writing of the record image, the user is notified in step S705 to remedy the situation and flow then returns to step S704 until the situation is remedied. After step S706, the print job index is sent for printing, preferably by printer 32, so that a print index is printed to correspond with the CD-ROM that is written for the customer order (step S707). In step S708, it is determined whether there is another customer order to be processed, and if so, flow passes back to step S701 in which the customer order is set up for the next, separate customer order. In this manner, the set-up and scanning for the next customer order can take place while the image record for the previous customer order is written to the medium by the image recorder. As mentioned above, this is possible because CD recorder 23 is on IDE bus 75 and film scanner 30 and flatbed scanner 31 are on SCSI bus 72. If it is determined in step S708 that there is not another customer order to be processed, flow passes to return in step S709.

Figure 8A:
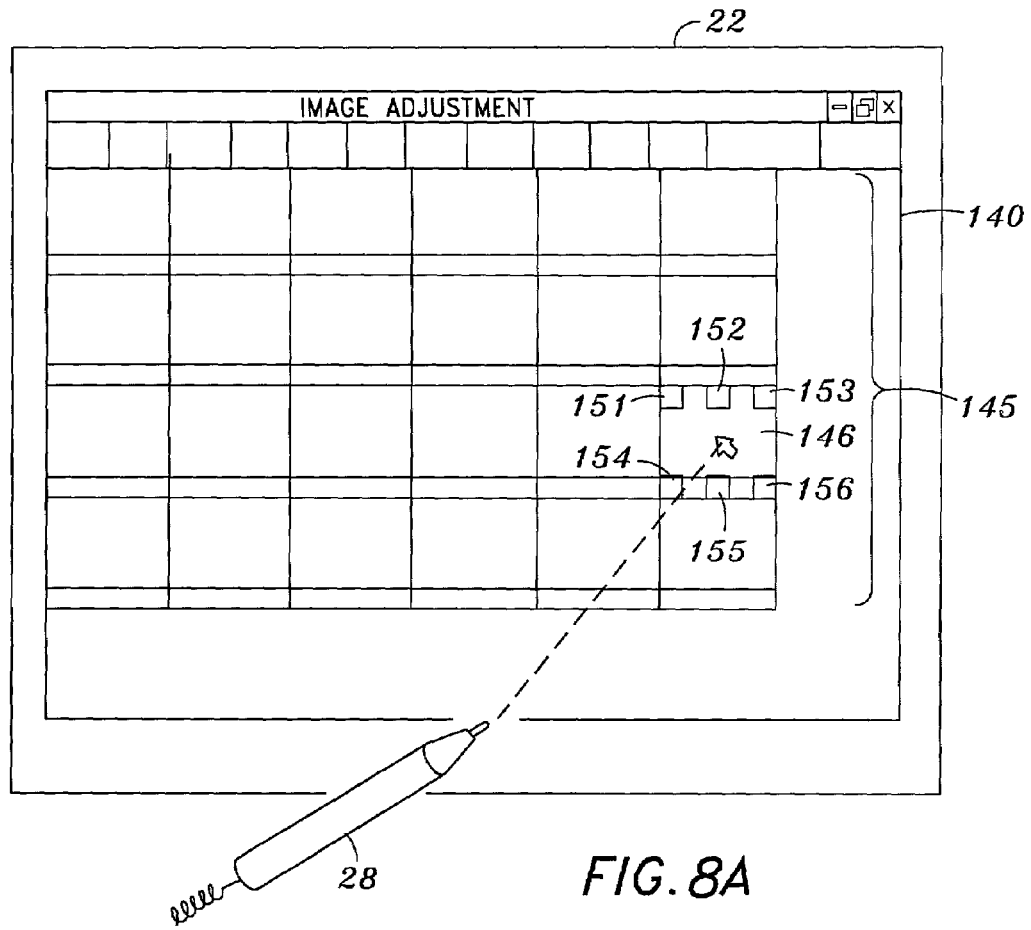
FIGS. 8A and 8B are block diagrams for depicting a user interface for adjusting digital images according to one embodiment of the invention.
Figure 8B:
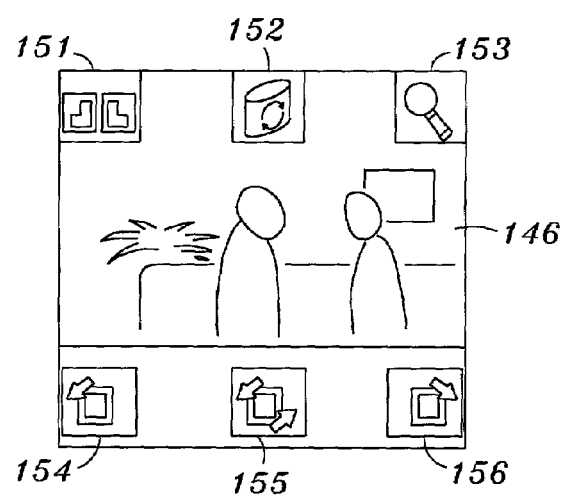

FIGS. 8A and 8B depict a user interface for adjusting digital images according to the present invention. Once the digital images are obtained, such as from film scanner 30, flatbed scanner 31, digital camera 33 or other sources, they are presented on display 22 for adjustment by the user with pen device 28 and/or mouse 26 and keyboard 27. As shown in FIG. 8A, twenty-four digital images 145 corresponding to a particular customer order are displayed in image adjustment window 140 on display 22. For example, digital images 145 may correspond to twenty-four film images which were scanned in with film scanner 30. When a user selects one of digital images 145 for adjustment, such as digital image 146, a series of function buttons 151-156 are presented surrounding selected digital image 146. Each of function buttons 151-156 corresponds to a particular digital image editing function, such as rotate, edit, sharpness, contrast, crop, dust, etc., which can be selected by the user with pen device 28 for application to digital image 146. Of course, it can be appreciated that any number of known digital image editing functions may be presented for application to the selected image.

FIG. 8B depicts a detailed perspective of selected digital image 146. As seen in FIG. 8B, each of function buttons 151-156 contains an icon corresponding to the associated digital image editing function. Accordingly, function button 151 as depicted in FIG. 8B corresponds to a digital image editing function for flipping the digital image horizontally. Function button 152 as depicted in FIG. 8B corresponds to a digital image editing function for deleting the digital image. Function button 153 as depicted in FIG. 8B corresponds to a digital image editing function for performing image edit functions to the digital image, including, but not limited to, sharpness adjustment, contrast adjustment, color adjustment, cropping, dusting and other known digital image editing functions. Function button 154 as depicted in FIG. 8B corresponds to a digital image editing function for rotating the digital image ninety degrees to the left. Function button 155 as depicted in FIG. 8B corresponds to a digital image editing function for flipping the digital image vertically. Lastly, function button 156 as depicted in FIG. 8B corresponds to a digital image editing function for rotating the digital image ninety degrees to the right.

Figure 9:
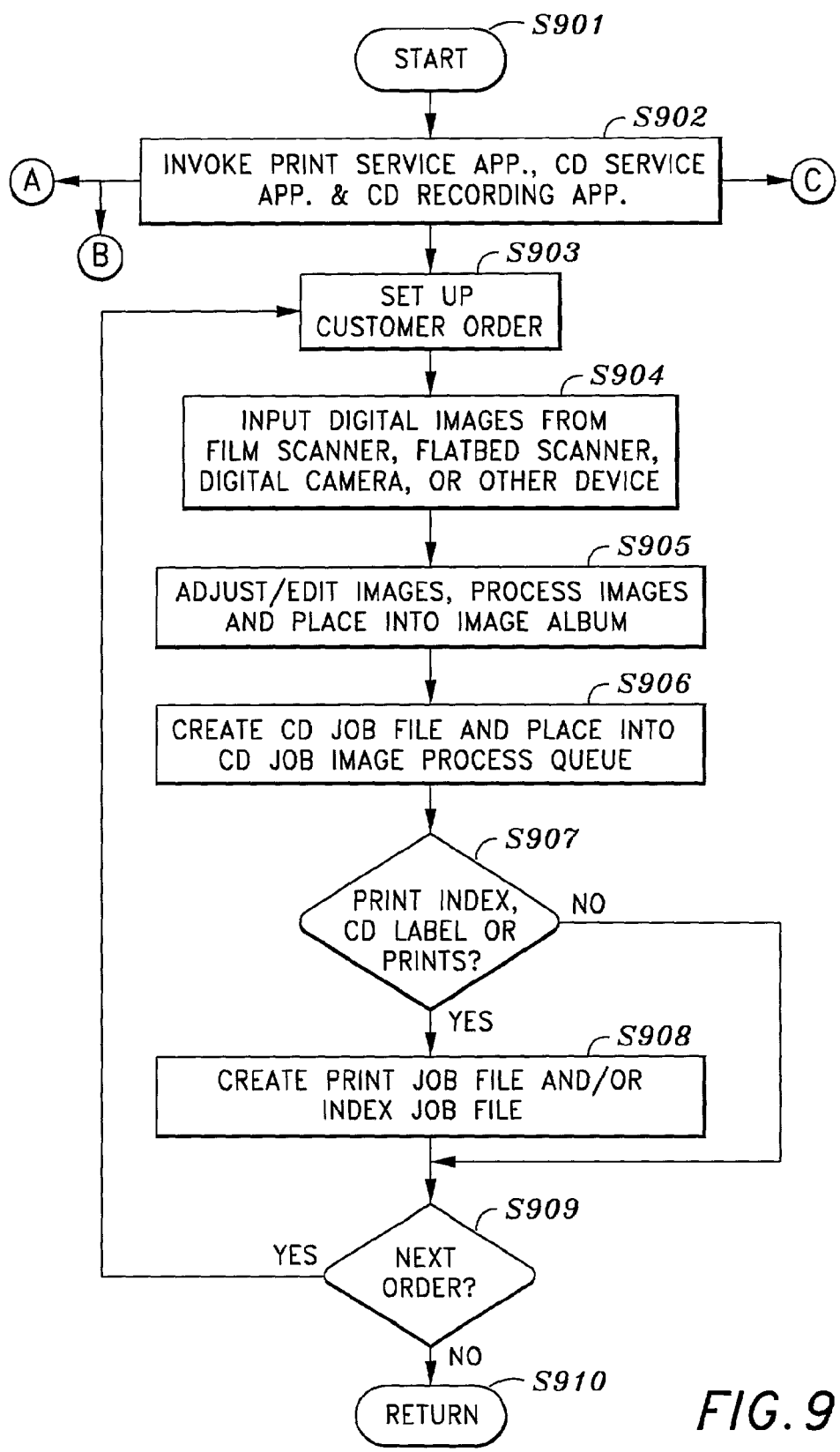
FIG. 9 is a detailed flow chart for describing the CD authoring main application depicted in FIGS. 4 and 6.

FIG. 9 provides a detailed flow chart for describing CD authoring main application 101 which acts as central process control for the present invention according to the embodiment depicted in FIGS. 6. In step S901, CD authoring main application 101 is started, such as at boot-up of photograph record authoring system 15 or upon receipt of a start command from the user. In step, S902, CD authoring main application 101 invokes the start of CD service application 102 (flowpath A), CD recording application 104 (flowpath B), and print service application 105 (flowpath C) so that they may execute in parallel with CD authoring main application 101. Of course, each of the aforementioned applications will wait in a suspended state until necessary data is provided for processing. Next, in step S903, the user inputs information regarding the customer order, such as customer identification, number and type of pictures, request for print index, CD label, prints and the like. In step S904, digital images are input from film scanner 30, flatbed scanner 31, digital camera 33 or another source. Once the digital images have been obtained, the user can adjust selected digital images as discussed above, and then all digital images for the customer order are processed so that appropriate sized versions of each digital image are placed in image album 111 for subsequent use (step S905).

In step S906, a CD job file is created and placed into CD job image process queue 106. As seen in FIG. 13A, each CD job file contains the customer order identification and the file names the particular ones of image files 112 in image album 111 that are to be written to a CD-ROM for the particular customer order. It is next determined in step S907 whether the customer order requests an index print, a CD label or photo prints. If so, flow passes to step S908 in which an index job file and/or print job file is created corresponding to the customer order and placed into print job image process queue 109. FIG. 13B depicts an example of one of index job files 119 and is seen to include a count which represents the number of pictures in the index. The index job file in FIG. 13B also includes the purpose of the index file which is for a CD, and the customer order number, as well as the filenames (preferably .bmp thumbnail images) of those of image files 112 from image album 111 that are to be included in the printed index.

FIG. 13C depicts an example of one of print job files 120 and is seen to include a count which represents the number of pictures in the print job. The print job file in FIG. 13C also includes the purpose of the print job file, which in this example is for a four-by-six photo print, and the customer order number, as well as the filenames (preferably .jpg images) of those of image files 112 from image album 111 that are to be printed according to the print job. Returning to FIG. 9, flow passes to step S909 directly after step S908 or if it is determined in step S907 that the customer order does not request an index print, CD label or photo prints. In step S909, it is determined if another customer order is desired, such as by an input from the user with pen device 28, upon which flow passes to step S903 to repeat steps S903 to S909. In this manner, CD authoring main application 101 continues to process more separate customer orders and creates CD job files, index job files and print job files corresponding to each customer order and places them into the appropriate queues for subsequent processing. If it is determined in step S909 that no more customer orders are desired, flow passes to return in step S910.

Figure 10A:
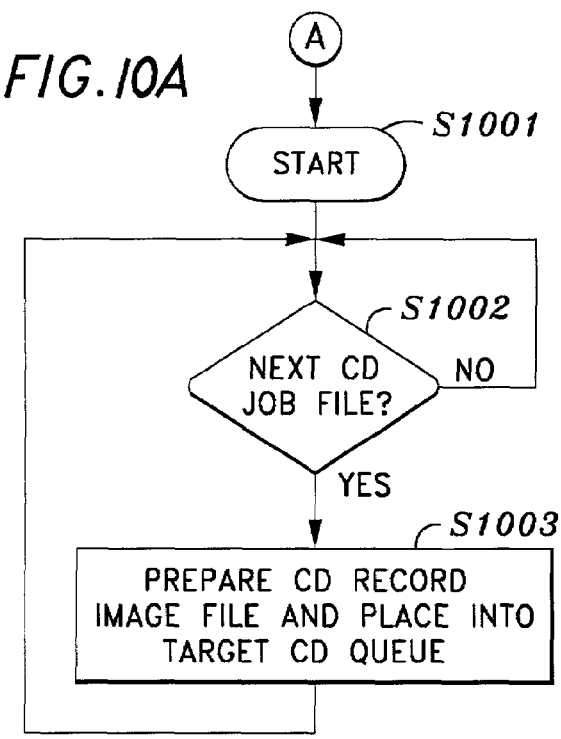
FIGS. 10A and 10B are detailed flow charts for describing the CD service application and CD recording application depicted in FIGS. 4 and 6.
Figure 10B:
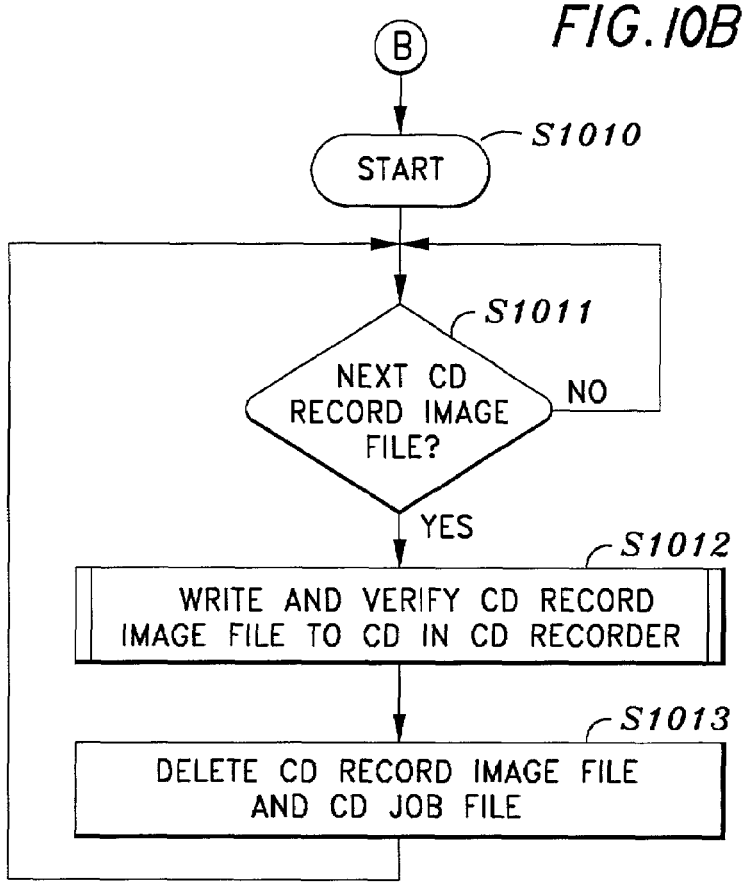

FIGS. 10A and 10B are detailed flow charts for describing CD service application 102 and CD recording application 104 which process each of CD job files 117 in CD job image process queue 106 so as to create a CD image and write the CD image to a CD-ROM using CD recorder 23. Turning to FIG. 10A, CD service application 102 is started in step S1001 by CD authoring main application 101 as depicted by entry point "A". In step S1002, it is determined if there is a CD job file in CD job image process queue 106 to be processed. If not, flow simply stays in a suspended loop until a CD job file is placed into CD job image process queue 106 by CD authoring main application 101. If a CD job file is present in CD job image process queue 106, CD service application 102 obtains the next one of CD job files 117 from CD job image process queue 106, prepares a CD image based on the information and filenames in the CD job file by obtaining the appropriate ones of image files 112 from album 111 and combining and formatting them into a CD record image file, which is then placed into target CD queue 107 (S1003). Flow then passes back to step S1002 to determine if another CD job file is present for processing.

In FIG. 10B, CD recording application 104 is started in step S1010 by CD authoring main application 101 as depicted by entry point "B". In step S1011, it is determined if there is a CD record image file in target CD queue 107 to be processed. If not, flow simply stays in a suspended loop at step S1011 until a CD record image file is placed into target CD queue 107 by CD service application 102. If a CD record image file is present in target CD queue 107, CD recording application 104 obtains the next one of CD record image files 114 from target CD queue 107, writes the CD record image file to a CD-ROM in CD recorder 23, and verifies that the CD record image file was properly written (step S1012).

Figure 12:
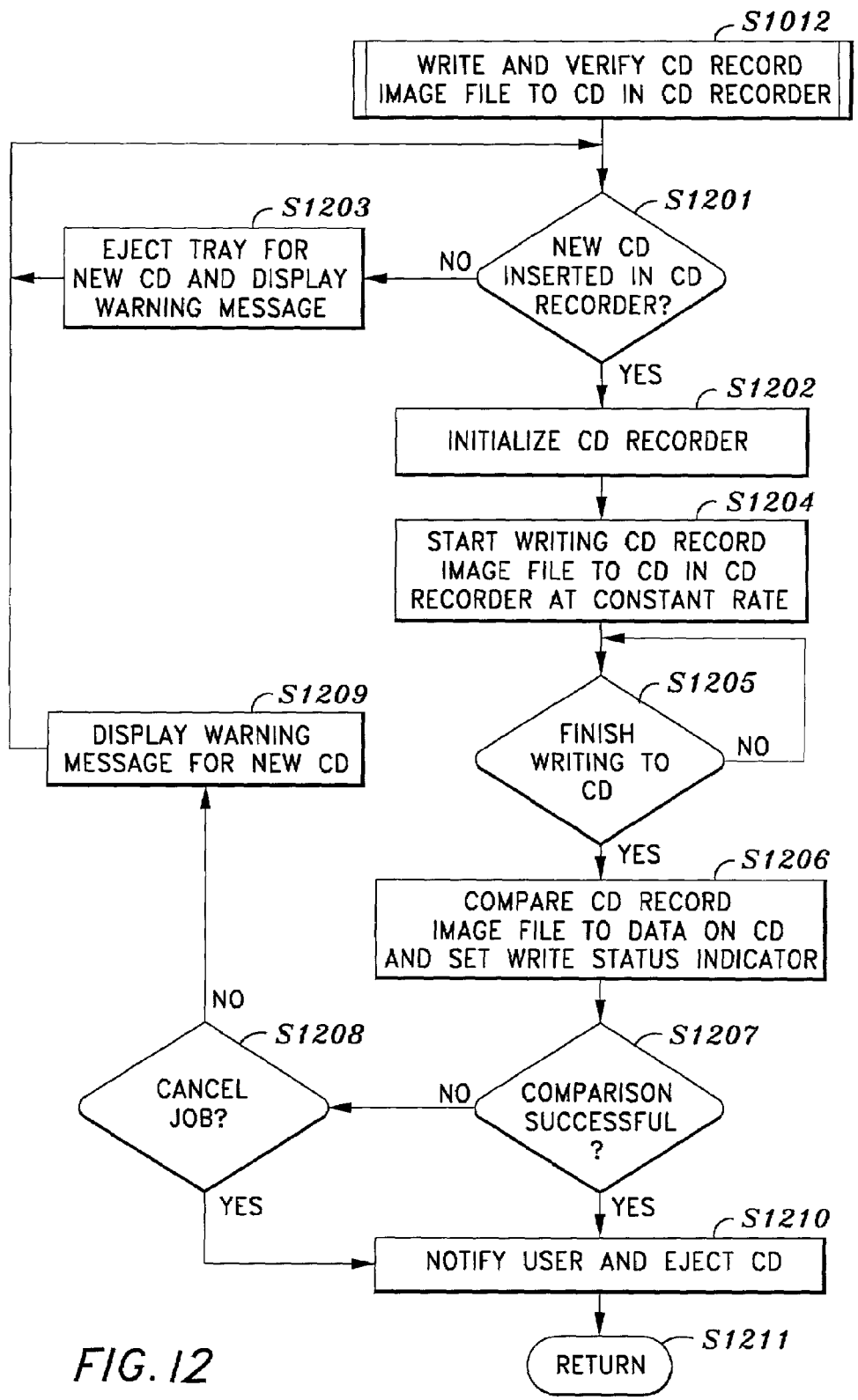
FIG. 12 is a detailed flow chart for describing the writing and verification of a record image to a CD-ROM as depicted in FIG. 10.

FIG. 12 presents a more detailed flowchart for describing step S1012 of FIG. 10B. In particular the write and verification of a CD record image file begins at step S1201 in which it is determined if a new blank CD-ROM is inserted into CD recorder 23. If so, flow passes to step S1202 in which CD recorder 23 is initialized. If not, flow passes to step S1203 in which a warning message is displayed to the user on display 22 and the tray of CD recorder 23 is ejected for insertion of a new blank CD-ROM and flow is passed back to step S1201 to confirm that a new CD has been inserted.

After initialization of CD recorder 23 in step S1202, flow passes to step S1204 in which the data from the CD record image file is transferred at a constant rate from memory to CD recorder 23 via IDE bus 75 for writing to the CD-ROM. Flow then passes to step S1205 which determines whether the writing of the CD record image to the CD-ROM is complete. If the writing is not complete, flow stays in a suspended state at step S1205 until complete. If the writing is complete, then flow passes to step S1206 in which a comparison is done between the original CD record image file and the data on the CD-ROM to determine if the writing of the CD record image to the CD-ROM was successful. A write status indicator is set to indicate whether the comparison shows a success or a failure of the writing step.

In step S1207 it is determined by checking the write status indicator whether the comparison was successful and, if so, flow then passes to step S1210. If it is determined in step S1207 that the comparison was not successful, flow passes to step S1208 in which it is determined whether the user desires to cancel the job. If so, flow passes to step S1210, and if not, flow passes to step S1209 in which the user is asked to insert another new blank CD-ROM into CD recorder 23, whereafter flow passes to step S1201 to reiterate the write and verification process. In step S1210, the user is notified that the writing and verification of the present job are complete and the tray is ejected from CD recorder 23 so that the user can remove the CD-ROM. Flow then passes to return in step S1211.

Returning to FIG. 10B, after write and verification step S1012 is complete, flow passes to step S1013 in which the CD record image file and the CD job file are deleted from target CD queue 107 and CD job image process queue 106, respectively. Flow then passes back to step S1011 to determine if another CD record image file is present in target CD queue 107 for processing.

Figure 11:
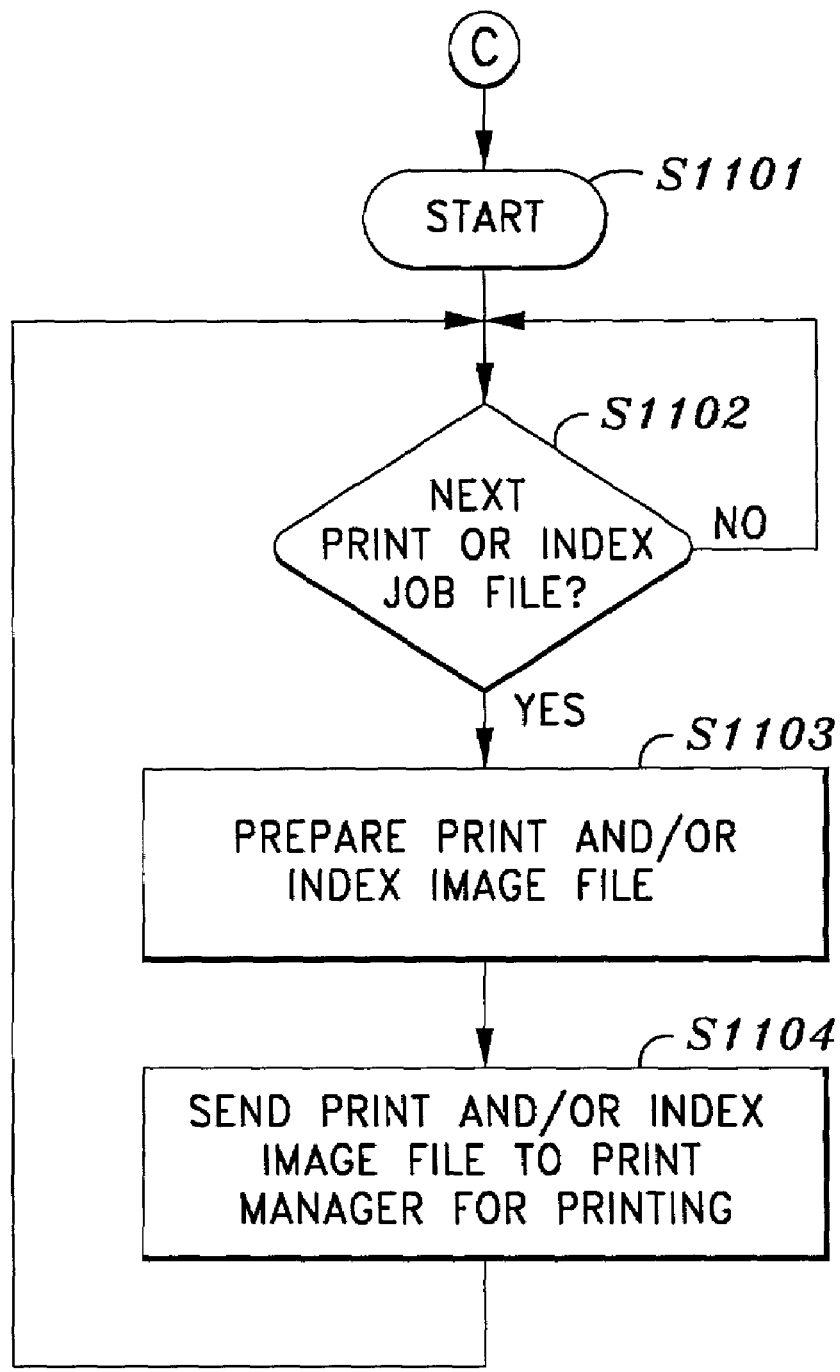
FIG. 11 is a detailed flow chart for describing the print service application depicted in FIGS. 4 and 6.

FIG. 11 is a detailed flow chart for describing print service application 105. As seen in FIG. 11, print service application 105 is started in step S1101 by CD authoring main application 101 as depicted by entry point "C". In step S1102, it is determined if there is an index job file or print job file in print job image process queue 109 to be processed. If not, flow simply stays in a suspended loop at step S1102 until an index job file or print job file is placed into print job image process queue 109 by CD authoring main application 101. If an index job file or print job file is present in print job image process queue 109, print service application 105 obtains the next one of index job files 119 or print job files 120, as the case may be, from print job image process queue 109, and prepares a print image file based on the information and filenames in the index or print job file by obtaining the appropriate ones of image files 112 from album 111 and then combining and formatting them into a print index file and/or print image file, which is then placed into target print queue 110 (S1103). In step S1104, each of print image files 115 and print index files 116 are sent to the print manager for printing on printer 32. Flow then passes back to step S1102 to determine if another index job file or print job file is present in print job image process queue 109 for processing.

In this manner, a set of pictures may be scanned in for a new customer order with a corresponding set of new job files while the CD record image for the previous customer order is still being written and the index print for the previous customer order is still being printed. Accordingly, it can be appreciated that much time and confusion is saved by allowing the processes of photograph record authoring system 15 to work in a parallel fashion instead of waiting for the completion of the entire CD authoring process before starting a new customer order. In addition, the user is notified if an error occurs when writing to a CD-ROM so that the situation can be quickly remedied without having to completely restart the entire process for a customer order.

FIG. 14 presents a timing chart for describing the advantages of the embodiment of the invention described above. As seen in FIG. 14, a timing comparison is made between the photograph record authoring system 15 of the present invention and a CD authoring system in which the user must wait to scan a new roll of film until the writing of the previous CD record image to the CD-ROM is completed. In FIG. 14, it is seen that each customer order is represented by a scan phase, a process phase and a CD write phase. The total process time of these three phases for each order is represented by t and is the same for each of customer orders 160 to 165. However, the top two orders 160 and 161 are performed in a CD authoring system in which the entire process for one order must be complete before the next order can begin. Accordingly, the total time to process customer orders is 2t.

In contrast, the present invention allows customer orders to overlap because the scan phase for the next order can be started while the processing phase (to create the CD image record) and the CD write phases for the previous order are performed. Accordingly, it can be seen that customer orders 162 to 165 can be completed in the present invention in a 2t amount of time, thereby allowing twice as many customer orders (four) to be completed in the same amount of time as a CD authoring system in which processing of a customer orders cannot be overlapped.

Figure 15:
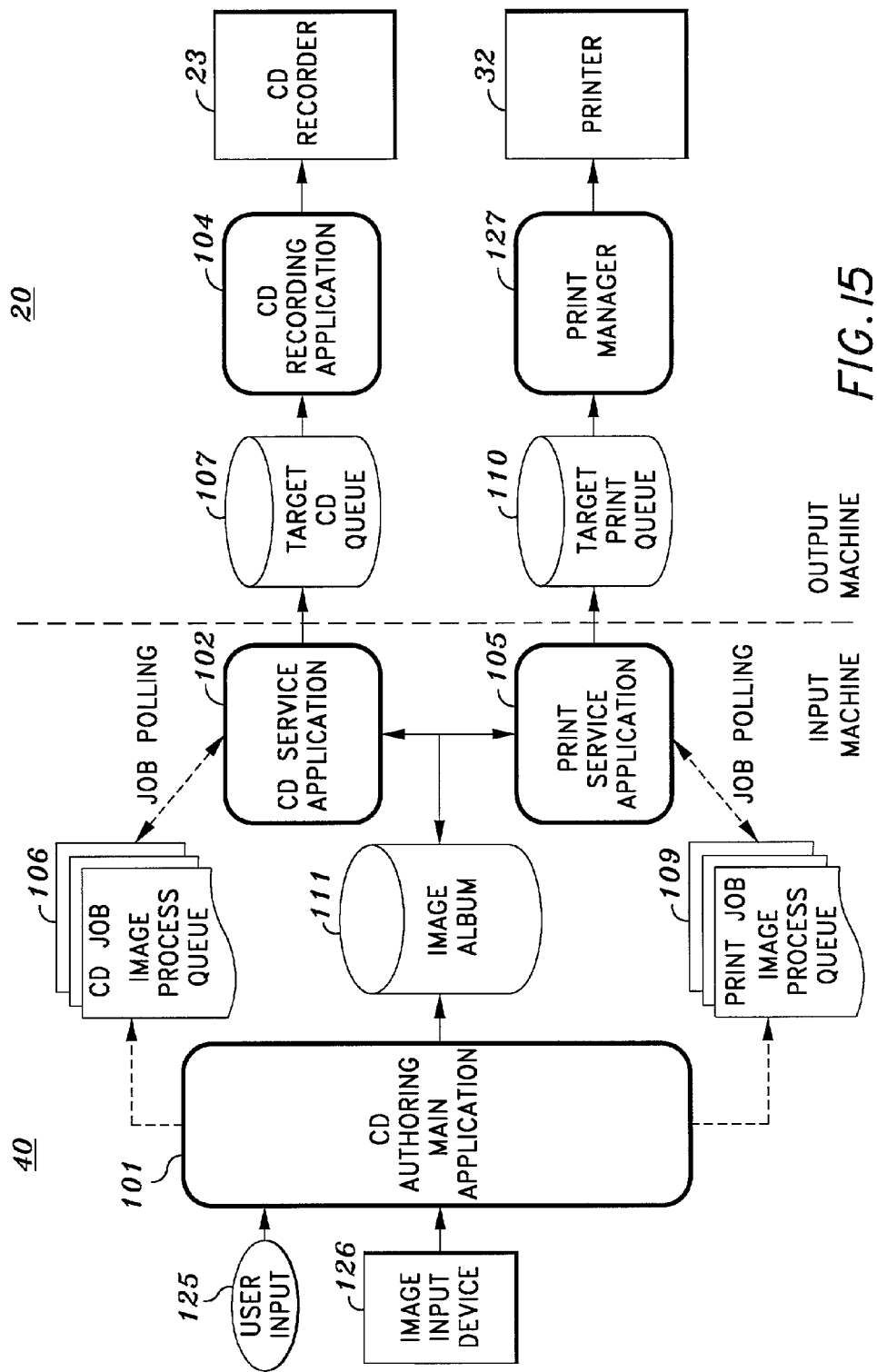
FIG. 15 is a block diagram which depicts a workflow of authoring digital image records to CD-ROMs in a networked environment according to a second embodiment of the invention.

FIG. 15 is a block diagram which depicts a workflow of authoring digital image records to CD-ROMs according to a second embodiment of the invention by using two computer-based systems. In particular, this embodiment uses computer 20 and computer 40 of FIG. 1 which are connected to each other via network 10. This embodiment performs the same processes as that of the single-computer embodiment except that the processes are distributed across two computers. Turning to FIG. 15, it can be seen that the workflow is the same as depicted in FIG. 6, except that the CD authoring main application 101, CD service application 102 and print service application 105 are performed in one of the computers, such as computer 40, and CD recording application 104 and print manager 127 are performed in the other computer, such as computer 20. In this example, computer 40 performs all of the necessary processing to create CD record image files 114, print image files 115 and print index files 116 for each customer order and sends them over a network to computer 20 where they are stored in target CD queue 107 and target print queue 110, respectively.

As seen in FIG. 15, computer 20 then retrieves each of CD record image files 114 from target CD queue 107 for writing to a CD-ROM at CD recorder 23, and retrieves each of print image files 115 and print index files 116 for printing to printer 32. In this manner, the workload is distributed between computing devices and may allow one computer to act as an output machine, while the other acts as an input machine. The process performed between the two machines are the same as that described above with respect to FIGS. 9 through 13, except that they are distributed between two computing devices. It can be appreciated that many computing devices may act as input machines so as to send CD record image files 114, print image files 115 and print index files 116 to a computing device which acts as an output machine to write CD-ROMS and print index prints. In this manner, many computing devices having scanners or other image sources such as digital cameras can send CD images and print images for a customer order to a computing device which acts as an output machine to write CD-ROMs and print index prints.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for authoring a plurality of digital image records, each digital image record corresponding to a separate customer order, in a digital image record authoring system including a dedicated computer having a computer processor, said method comprising:

a scanning step to transmit a plurality of digital images corresponding to a separate customer order over a first data path from a scanner to the computer processor, wherein the first data path includes one or more first high-speed image data interface buses;

a processing step to process the plurality of digital images by the computer processor and to combine the processed plurality of digital images into a record image, wherein the processing step includes:

displaying a user interface that allows a user to select images from the plurality of digital images;

displaying a user interface that allows the user to adjust the selected images; and combining the adjusted images into the record image; and a writing step to transmit the record image over a second data path from the computer processor to an image-recorder for recording onto a medium, wherein the second data path includes one or more second high-speed image data interface buses, wherein each of the one or more second high-speed image data interface buses is separate from each of the one or more first high-speed image data interface buses;

wherein the scanning step is repeated, prior to completion of the writing step, to transmit a new plurality of images corresponding to a new customer order over the first data path, such that transfer of the new plurality of digital images over the first data path and transfer of the record image over the second data path occur simultaneously over separate paths, and wherein a queue for job files corresponding to customer orders, a queue for record images, and a queue for print files are each continuously polled in parallel.

2. A method according to claim 1, wherein the processing step is repeated to process the new plurality of digital images and to combine the processed new plurality of digital images into a new record image.

3. A method according to claim 2, wherein the writing step is repeated to transmit the new record image to a new medium by the image-recorder, wherein the writing step for the new medium image is initiated after completion of the writing step for the previous record image.

4. A method according to claim 3, wherein each record image is stored in an image-queue prior to being transmitted to each respective medium by the writing step.

5. A method according to claim 4, wherein the writing step includes the step of obtaining, from image-queue, the record image to be transmitted to the medium.

6. A method according to claim 4, wherein the image-queue is represented by an image-queue file.

7. A method according to claim 1, further including the steps of generating a print index file including a thumbnail representation of each of the adjusted images and sending the print index file to a printer to print a corresponding print index.

8. A method according to claim 7, wherein the step of generating a print index file includes sending the print index file to a print queue and wherein the step of sending the print index file to the printer includes retrieving a next print index file from the print queue.

9. A method according to claim 8, wherein the print queue is represented by a print queue file.

10. A method according to claim 7, wherein the print index file is sent to the printer regardless of whether the record image corresponding to the plurality of digital images represented in the print index file has been transmitted to the medium in the writing step.

11. A method according to claim 1, wherein the writing step includes generating a write status indicator which is used to indicate a success in the event that the record image is successfully written to the medium, and which is used to indicate an error in the event that the record image is not successfully written to the medium.

12. A method according to claim 11, wherein the writing step is not repeated for a new record image if the write status indicator indicates an error.

13. A method according to claim 11, wherein the writing step is repeated for the same record image if the write status indicator indicates an error.

14. A method according to claim 11, wherein the record image is compared to the medium at the end of the writing step to determine if the record image is successfully written to the medium.

15. A method according to claim 1, wherein the first high-speed image data interface bus is a SCSI interface and the second high-speed image data interface bus is an IDE interface.

16. A method according to claim 1, wherein the adjustment includes cropping.

17. A method according to claim 1, wherein the adjustment includes rotating.

18. A method according to claim 1, wherein the adjustment includes a contrast adjustment.

19. A method according to claim 1, wherein the adjustment includes a sharpness adjustment.

20. A method according to claim 1, wherein the adjustment includes a color adjustment.

21. A method according to claim 1, wherein the adjustment includes image editing.

22. A method according to claim 1, wherein a thumbnail representation of each of the selected digital images is displayed on a monitor connected to the computer, and wherein each selected image is adjusted by a pointing device connected to the computer.

23. A method according to claim 1, wherein the scanning step and processing step are performed in a second computer which is connected to the dedicated computer via a network, and the writing step is performed in the dedicated computer.

24. A method according to claim 1, wherein a second computer is connected to the dedicated computer, and wherein the scanning step and the processing step are performed in the dedicated computer and the writing step is performed in the second computer.

25. A method according to claim 1, wherein the medium is a CD-ROM.

26. A method according to claim 1, wherein the medium is a DVD.

27. A method according to claim 1, wherein the medium is a digital tape.

28. A method according to claim 1, wherein the medium is a diskette.

29. A method according to claim 1, wherein the medium is a digital mini-disc.

30. A method according to claim 1, wherein the medium is a memory card.

31. A method according to claim 1, wherein the medium is a memory chip.

32. A method according to claim 1, wherein the medium is a memory storage device.

33. A method for authoring a plurality of digital image records, each digital image record corresponding to a separate customer order, in a digital image record authoring system including a dedicated computer having a computer processor, said method comprising:

a scanning step to transmit a plurality of digital images corresponding to a separate customer order over a first data path from a scanner to the computer processor, wherein the first data path includes one or more first high-speed image data interface buses;

a processing step to process the plurality of digital images by the computer processor and to combine the processed plurality of digital images into a record image, wherein the processing step includes:

displaying a user interface that allows a user to select images from the plurality of digital images;

displaying a user interface that allows the user to adjust the selected images; and combining the adjusted images into the record image; and a writing step to transmit the record image over a second data path from the computer processor to an image-recorder for recording onto a medium, wherein the second data path includes one or more second high-speed image data interface buses, wherein each of the one or more second high-speed image data interface buses is separate from each of the one or more first high-speed image data interface buses, and the record image being passed from the dedicated computer to the image-recorder at a constant rate;

wherein the scanning step is repeated, prior to completion of the writing step, to transmit a new plurality of images corresponding to a new customer order over the first data path, such that transfer of the new plurality of digital images over the first data path and transfer of the record image over the second data path occur simultaneously over separate paths, and wherein a queue for job files corresponding to customer orders, a queue for record images, and a queue for print files are each continuously polled in parallel.

34. A method for authoring a plurality of digital image CD-ROMs, each digital image CD-ROM corresponding to a separate customer order, in a digital image CD-ROM authoring system including a dedicated computer having a computer processor, said method comprising:

a scanning step to transmit a plurality of digital images corresponding to a separate customer order over a first data path from a scanner to the computer processor, wherein the first data path includes one or more first high-speed image data interface buses;

an adjusting step to adjust each of the plurality of digital images which were scanned in from the scanner, wherein the adjusting step includes:

displaying a user interface that allows a user to select images from the plurality of digital images; and displaying a user interface that allows the user to adjust the selected images;

a generating step to generate a print index file including a thumbnail representation of each of the adjusted images, the print index file for printing by a printer;

a processing step to process the plurality of digital images and to combine the processed plurality of digital images into a CD-ROM image, wherein the processing step includes combining the adjusted images into the record image; and a CD-writing step to transmit the CD-ROM image over a second data path from the computer processor to a CD-recorder for recording onto a CD-ROM, wherein the second data path includes one or more second high-speed image data interface buses, wherein each of the one or more second high-speed image data interface buses is separate from each of the one or more first high-speed image data interface buses;

wherein the scanning step is repeated, prior to completion of the CD-writing step, to transmit a new plurality of images corresponding to a new customer order over the first data path, such that transfer of the new plurality of digital images over the first data path and transfer of the record image over the second data path occur simultaneously over separate paths, the processing step is repeated to process the new plurality of digital images and to combine the processed new plurality of digital images into a new CD-ROM image, and the CD-writing step is repeated to transmit the new CD-ROM image to a new CD-ROM placed in the CD-recorder after completion of the CD-writing step for the previous CD-ROM image, and wherein a queue for job files corresponding to customer orders, a queue for CD-ROM images, and a queue for print files are each continuously polled in parallel.

35. A dedicated computer for authoring a plurality of digital image records, each digital image record corresponding to a separate customer order, in a digital image record authoring system comprised of the dedicated computer having a computer processor, a scanner connected to the computer processor by a first data path including one or more first high-speed image data interface buses, and an image-recorder connected to the computer processor by a second data path including one or more second high-speed image data interface buses, wherein each of the one or more second high-speed image data interface buses is separate from each of the one or more first high-speed image data interface buses, comprising: a program memory for storing process steps executable to perform a method according to any of claims 1 to 15 and 16 to 34 a processor for executing the process steps stored in said program memory.

36. Computer-executable process steps stored on a computer readable medium, said computer-executable process steps for authoring a plurality of digital image records, each digital image record corresponding to a separate customer order, in a digital image record authoring system comprised of a dedicated computer having a computer processor, a scanner connected to the computer processor by a first data path including one or more first high-speed image data interface buses, and an image-recorder connected to the computer processor by a second data path including one or more second high-speed image data interface buses, wherein each of the one or more second high-speed image data interface buses is separate from each of the one or more first high-speed image data interface buses, said computer-executable process steps comprising process steps executable to perform a method according to any of claims 1 to 15 and 17 to 34.

37. A computer-readable medium which stores computer-executable process steps, the computer-executable process steps for authoring a plurality of digital image records, each digital image record corresponding to a separate customer order, in a digital image record authoring system comprised of a dedicated computer having a computer processor, a scanner connected to the computer processor by a first data path including one or more first high-speed image data interface buses, and an image-recorder connected to the computer processor by a second data path including one or more second high-speed image data interface buses, wherein each of the one or more second high-speed image data interface buses is separate from each of the one or more first high-speed image data interface buses, said computer-executable process steps comprising process steps executable to perform a method according to any of claims 1 to 15 and 16 to 34.

* * * * *